United States Patent [19]

Gaitskell

[11] Patent Number: 4,612,222

[45] Date of Patent: Sep. 16, 1986

[54] POLYAMIDE ARTICLES RESISTANT TO HOT ANTIFREEZE COMPOSITIONS

[75] Inventor: John N. Gaitskell, Cleveland, England

[73] Assignee: Imperial Chemical Industries PLC, London, England

[21] Appl. No.: 615,031

[22] Filed: May 29, 1984

[30] Foreign Application Priority Data

Jun. 24, 1983 [GB] United Kingdom ............. 8317223

[51] Int. Cl.$^4$ .............................................. B27N 5/02
[52] U.S. Cl. .................................. 428/35; 428/474.4; 428/475.5; 525/66; 525/183
[58] Field of Search ............... 525/66, 183; 428/474.4, 428/35, 475.5; 165/104.32

[56] References Cited

U.S. PATENT DOCUMENTS

| | | | |
|---|---|---|---|
| 3,419,517 | 12/1968 | Hedrick et al. | 528/315 |
| 4,321,336 | 3/1982 | Meyer et al. | 525/183 |
| 4,335,223 | 6/1982 | Flood et al. | 528/183 |
| 4,346,194 | 8/1982 | Roura | 525/183 |
| 4,423,186 | 12/1983 | Grigo et al. | 525/190 |

Primary Examiner—Edith Buffalow
Attorney, Agent, or Firm—Cushman, Darby & Cushman

[57] ABSTRACT

A polyamide article for use in contact with antifreeze compositions at elevated temperatures wherein the article is formed of a reinforced composition comprising a polyamide selected from nylon 66, nylon 6 and nylon 610 or copolymers thereof, from 10 to 60% by weight of reinforcing filler and from 0.1 to 10%, preferably 0.25 to 5% by weight of a copolymer formed from ethylenically unsaturated monomers and having functional groups extending from the polymer chain capable of reaction with the end groups of the polyamide polymer wherein the copolymer contains up to 50 mole % of residues obtained from ethylenically unsaturated monomers containing functional groups. The functional groups are preferably carboxylic acid or carboxylic acid anhydride groups. The articles include radiator end tanks and water pump bodies and impellers.

6 Claims, No Drawings

POLYAMIDE ARTICLES RESISTANT TO HOT ANTIFREEZE COMPOSITIONS

This invention relates to polyamide articles for use in contact with antifreeze compositions at elevated temperature.

There are a growing number of applications for plastics replacements for automobile parts formerly made from metals. For those parts which are used in chemically aggressive environments it is necessary that the plastics replacement should have an adequate performance in service. Although polyamides, such as nylon 66 and nylon 6 are useful for many applications, particularly when reinforced with glass fibres, some articles come into contact with the particularly hostile environment of antifreeze at elevated temperatures. Such articles need to be made from reinforced polyamide compositions having optimum resistance to this environment so that the mechanical properties of the articles are maintained at a high level during the lifetime of the vehicle. Improvements in performance may be achieved by selecting a glass fibre carrying a size which maintains good adhesion between the glass fibre and the polyamide matrix in service. The present invention enables an additional improvement to be obtained.

According to the present invention there is provided a polyamide article for use in contact with antifreeze compositions at elevated temperatures wherein the article is formed of a reinforced composition comprising a polyamide selected from nylon 66, nylon 6 and nylon 610 or copolymers thereof, from 10 to 60% by weight of reinforcing filler and from 0.1 to 10%, preferably 0.25 to 5% by weight of a copolymer formed from ethylenically unsaturated monomers and having functional groups extending from the polymer chain capable of reaction with the end groups of the polyamide polymer wherein the copolymer contains up to 50 mole % of residues obtained from ethylenically unsaturated monomers containing functional groups. Preferably at least 0.5% weight of such functional groups containing monomers are present in the copolymer.

The functional groups are preferably carboxylic acid groups or carboxylic acid anhydride groups, but polymers containing hydroxyl or amino groups also have a useful effect in improving the antifreeze resistance of articles formed from the reinforced composition.

It has been found that the presence of the copolymer in the reinforced polyamide composition produces a significant improvement in the resistance of the composition to hot antifreeze compositions irrespective of the improvement already resulting from the size on the glass fibre. Thus although some glass fibres supplied by the glass fibre manufacturers may already carry a size which includes an acrylic polymer the additional copolymer in the polyamide composition provides an increased resistance to hot antifreeze.

Particularly useful copolymers are those containing a major proportion of either an alkyl acrylate or an alkyl methacrylate in which the alkyl group contains from 1 to 10 carbon atoms. Acrylic polymers contain at least 50% by weight of repeat units derived from methyl methacrylate are particularly useful.

The copolymer may be chosen from a wide variety of polymers. Thus the copolymer may be for example a random, graft or sequentially produced polymer. There are a number of criteria to be observed in the choice of copolymer. Firstly, the copolymer should be sufficiently compatible with the polyamide so that its inclusion in the polyamide composition does not result in significant deterioration of the properties of the polyamide before the polyamide has been subjected to any heat ageing in the presence of an antifreeze composition. Secondly, the presence of the functional group containing copolymer should not increase the melt viscosity of the polyamide composition to such an extent that it becomes difficult to mould.

Typical functional group containing copolymers which can be used are copolymers of methacrylic acid esters or acrylic acid esters together with copolymerisable carboxylic acid or carboxylic-acid-anhydride-containing monomers such as acrylic and methacrylic acids, copolymers of olefins and carboxylic-acid-containing or carboxylic-acid-anhydride-containing monomers (including graft copolymers), copolymers of styrene with copolymerisable carboxylic acid or carboxylic acid anhydride monomers. Polyethylenically unsaturated cross-linking or graft linking agents may be polymerised in the copolymer.

The reinforcing filler of the composition is preferably in the form of glass fibres, but may consist at least partially of other fillers which are capable of improving the mechanical properties of the composition such as glass beads, calcined clays, mica and wollastonite.

The polyamide articles of the invention are of value for use in any application which is subjected in use to an environment of antifreeze compositions, particularly where the antifreeze is raised to an elevated temperature for at least part of the service time. Articles made from the compositions herein described are particularly useful in various applications in automobiles where antifreeze compositions are used as a cooling medium. Such applications include radiator end tanks, radiator drain cocks, water pump impellers, water pump bodies and hose connections.

These articles may be subject to a wide variety of antifreeze compositions and temperature fluctuations when in use, although the large proportion of commercial antifreezes employ mixtures of ethylene glycol as the main constituent of the composition. Although a wide variation in test condition may be used to judge the performance of articles according to the present invention a preferred test method employs an antifreeze composition consisting of 97 parts by weight of ethylene glycol and 3 parts by weight sodium tetraborate decahydrate, which mixture was diluted with an equal volume of deionised water.

The invention will now be described with reference to the following examples.

EXAMPLE 1

A series of blends was made up by tumbling together (a) nylon 66 granules of RV in the range 49–55 (measured according to ISO R600), which contained a heat stabiliser for polyamide, (b) chopped glass fibres and (c) a polymeric additive (as listed in the Tables below). Each blend contained 30 parts by weight of the glass fibre and the number of parts by weight of the polymeric additive indicated in the accompanying Tables Ia, Ib, Ic, both per hundred parts by weight of the total blend. The designation of each glass fibre type used and the description of each polymer additive are given in Tables II and III. The polymeric additives were sieved through and 850 μm mesh (or a 1200 μm msesh in the case of Polymer A) to get rid of lumps before blending.

Control blends containing 30 parts by weight of the glass fibre but no polymeric additive were also made up.

Each blend was compounded using a single screw 2-stage plasticising extruder, with by-pass and vacuum venting: the screw diameter was 5 cm, the length to diameter ratio of the screw was 31.5 and compression ratio was 4:1. The compounds were produced as lace from a single hole die, quenched in a water bath, cooled and pelletised. Extruder barrel temperature controls were all set at 300° C. and the screw speed was 120 rpm. The extruded lace was passed through a short quench bath to minimise water pick-up of the granules. Vacuum was applied to the vent during extrusion.

The dry pellets were injection moulded using a Stubbe SKM 51S injection moulding machine to produce 1SO-type test pieces for tensile testing and for Charpy impact testing. Notches were moulded into the specimens for the notched impact test.

Sets of three bars of each compound (i.e. three tensile specimens, three unnotched Charpy specimens and three notched Charpy specimens) were conditioned in a model solution of hot antifreeze, comprising a solution of 3 parts (by weight) of sodium tetraborate decahydrate ($Na_2B_4O_7.10H_2O$) in 97 parts ethylene glycol which was diluted 50/50 (by volume) with de-ionised water. Conditioning was carried out by placing the sets of bars in cylindrical pressure vessels of internal dimensions approximately 80 mm in diameter and 360 mm high and filling each vessel up to a level 30 mm below the upper flange of the vessel, after the test specimens had been inserted. A number of vessels was used, each incorporating sets of tensile and Charpy bars of 8 different compounds. After inserting the specimens and conditioning liquid each vessel was sealed by bolting an essentially flat cap onto the upper flange of the vessel each cap carried a tap for release of internal pressure and a bursting disc for safety. The taps were closed and the vessels were placed in a hot air circulating oven controlling at about 148° C. 96 hours after inserting the vessels into the oven they were removed, allowed to cool in the ambient conditions and opened. The bars were transferred to other containers but were kept immersed in the conditioning liquid until just before test. They were then superficially dried and tested by the ISO methods ISO R527 (tensile, bar type 1) and ISO 179/2C (notched) and ISO 179/2D (unnotched) (Charpy), except that only 3 test pieces were available from each compound for each test. Mean values from these tests are given in Tables IA, IB and IC.

TABLE IA

Compound type: 30% GR nylon 66, heat stabilised, natural.
Property: Tensile strength.
Units: MPa.
Ageing { Medium: Buffered 50/50 ethylene glycol/water. Temperature: 148° C. Time: 96 hours.

| Additive Code | Concentration % by wt | Glass Fiber Code No. 1 | 2 | 3 | 4 |
|---|---|---|---|---|---|
| Nil (Control) | — | 28 | 27 | 39 | 28 |
| A | 3.5 | 56 | — | — | — |
| B | 0.25 | 34 | — | 49 | — |
| B | 1.0 | 38 | 36 | 67 | 39 |
| C | 1.0 | 36 | — | 52 | — |
| D | 0.5 | — | — | — | 42 |
| D | 1.0 | 46 | — | — | — |
| E | 0.5 | — | — | — | 45 |
| F | 0.5 | — | 41 | — | — |
| G | 2.0 | 31 | 37 | — | — |

TABLE IA-continued

Compound type: 30% GR nylon 66, heat stabilised, natural.
Property: Tensile strength.
Units: MPa.
Ageing { Medium: Buffered 50/50 ethylene glycol/water. Temperature: 148° C. Time: 96 hours.

| Additive Code | Concentration % by wt | Glass Fiber Code No. 1 | 2 | 3 | 4 |
|---|---|---|---|---|---|
| H | 2.0 | 33 | — | — | — |

TABLE IB

Compound type: 30% GR nylon 66, heat stabilised, natural.
Property: Unnotched Charpy Impact.
Units: $kJ/m^2$
Ageing { Medium: Buffered 50/50 ethylene glycol/water. Temperature: 148° C. Time: 96 hours.

| Additive Code | Concentration % by wt | Glass Fiber Code No. 1 | 2 | 3 | 4 |
|---|---|---|---|---|---|
| Nil (Control) | — | (16.9) 17 | 24 | 17 | Not measured |
| A | 3.5 | 31 | — | — | Not measured |
| B | 0.25 | 17.3 | — | 22 | Not measured |
| B | 1.0 | 22 | 19 | 31 | Not measured |
| C | 1.0 | 19 | — | 24 | Not measured |
| D | 0.5 | — | — | — | Not measured |
| D | 1.0 | 32 | — | — | Not measured |
| E | 0.5 | — | — | — | Not measured |
| F | 0.5 | — | 24 | — | Not measured |
| G | 2.0 | 20 | 18 | — | Not measured |
| H | 2.0 | 18 | — | — | Not measured |

TABLE IC

Compound type: 30% GR nylon 66, heat stabilised, natural.
Property: Notched Charpy.
Units: $kJ/m^2$
Ageing { Medium: Buffered 50/50 ethylene glycol/water. Temperature: 148° C. Time: 96 hours.

| Additive Code | Concentration % by wt | Glass Fiber Code No. 1 | 2 | 3 | 4 |
|---|---|---|---|---|---|
| Nil (Control) | — | 7.5 | 9.4 | 7.6 | Not measured |
| A | 3.5 | 10.6 | — | — | Not measured |
| B | 0.25 | 8.3 | — | 8.5 | Not measured |
| B | 1.0 | 7.9 | 8.2 | 12.6 | Not measured |
| C | 1.0 | 8.3 | — | 9.1 | Not measured |
| D | 0.5 | — | — | — | Not measured |
| D | 1.0 | 12.1 | — | — | Not measured |
| E | 0.5 | — | — | — | Not measured |
| F | 0.5 | — | 9.8 | — | Not measured |
| G | 2.0 | 7.8 | 9.1 | — | Not measured |
| H | 2.0 | 7.6 | — | — | Not measured |

TABLE II

Glass fiber types used: All were chopped strands sold as being suitable for polyamide reinforcement

| Glass number used in Examples | | Description |
|---|---|---|
| 1 | Silenka 8044 | 4½ mm nominal chopped length |
| 2 | Bayer CS7911 | 3 mm nominal chopped length |
| 3 | Fiberglass WX2552 | 3 mm nominal chopped length |
| 4 | Silenka 8042 | 4½ mm nominal chopped length |

TABLE III

Polyeric additives used in Example I

| Designation | Formulation (parts by weight of monomeric constituents) | | Reduced viscosity** |
|---|---|---|---|
| A | Sequentially polymerised emulsion polymer* (see composition below) | | — |
| B | MMA/EA/MAA 94/3/3 | (granular) | 0.3 |
| C | MMA/EA/AA 94/3/2.5 | (granular) | 0.3 |
| D | MA/EA/MAA 82/3/15 | (emulsion) | 0.24 |
| E | MMA/EA/MAA 72/3/25 | (emulsion) | 0.24 |
| F | MMA/EA/MAA 83/3/13 | (emulsion) | 0.35 |
| G | MMA/EA 97/3 | (emulsion) | 0.24 |
| H | MMA/HEMA 95/5 | (granular) | 0.6 |
| I | MMA/EA/MAA 92/3/5 | | |

BA = butyl acrylate
BGDM = butylene glycol dimethacrylate
EGDM = ethylene glycol dimethacrylate
MMA = methyl methacrylate
EA = ethyl acrylate
MAA = methacrylic acid
AA = acrylic acid
HEMA = hydroxyethyl methacrylate
*1st stage BA/BGDM in weight ratio 99:1, 2nd stage MMA/MAA/EGDM in weight ratio 90/10/0.5. Weight ratio of stage 1: stage 2 = 77:23
**Measured on solution in chloroform (1 g polymer/100 ml chloroform).

EXAMPLE 2

Blends were made up by tumbling together (a) unstabilised nylon 6 granules of RV about 50 (b) chopped glass fibres (Type 4 of Table II) and (c) polymeric additive (Type I of Table III), such that each blend contained 30 parts by weight of the glass fibre and respectively 0, 0.5 and 1.0 parts by weight of additive I.

The blends were extrusion compounded according to the procedure of Example 1 except in that an indicated melt temperature of 260° C. was used.

Tensile bar specimens were injection moulded and conditioned in hot antifreeze according to the procedure of Example 1. The values of tensile strength obtained after conditioning were respectively 8.0, 12.4 and 17.1 MPa for polymer additive concentrations of 0, 0.5 and 1.0 parts.

EXAMPLE 3

The melt flow index (MFI) of selected nylon 66 based compositions was measured as follows essentially following the method of ASTM D1238. A few grams of the granules made as in Example 1 were dried thoroughly under vacuum for at least 18 hours at about 100° C., and the melt flow rate measured using a Davenport MFI Grader at 285° C. Two values were obtained in each case using (a) a 2.16 kg weight on the piston and (b) a 10.0 kg weight. The standard die was used. Values obtained appear in Table V.

TABLE V

Compound type: 30% GR nylon 66, stabilised, natural.
Property: MFI.
Units: grames per 10 minutes.
Piston weight: 2.16 kg/10.0 kg.
Measured on dried pellets of compound.

| Additive Code | % | Glass Fiber Code No. | | | |
|---|---|---|---|---|---|
| | | 1 | 2 | 3 | 4 |
| Nil (control) | | 7.5 | 62 | | 6.7 57 |
| A | 3.5 | 2.7 | 25 | | |
| B | 0.25 | 7.4 | 61 | | |
| B | 1.0 | 7.0 | 58 | | 4.0 37 |
| C | 1.0 | | | | |
| D | 0.5 | | | | 1.9 21 |
| D | 1.0 | 0.4 | 3.7 | | |
| E | 0.5 | | | | 0.4 5.3 |

EXAMPLE 4

A blend was made up by tumbling together (a) nylon 66 granules of RV in the range 49–55, which contained a heat stabiliser for polyamide, (b) chopped glass fibres of type 3 in Table II, and (c) an additive consisting of a 50/50 (mole percent) copolymer of ethylene and maleic anhydride. This type of polymeric material is sold by Monsanto and the grade used was EMA 21 (EMA is a Registered Trade Mark), a free flowing powder of an estimated average molecular weight of 25,000 (manufacturer's date). The blend contained 30 parts by weight of the glass fibre and 0.5 parts by weight of the EMA 21, both per hundred parts by weight of the total blend. A control blend containing 30 parts by weight of the same glass fibre but no polymeric additive was also made up.

Each blend was extrusion compounded into pellets and the dry pellets were injection moulded to produce ISO test pieces, all in the manner described in Example 1.

Sets of three bars of each compound (i.e. three ISO tensile bars, three unnotched and three notched charpy bars) were conditioned in a vessel as described in Example 1; the differences between the conditioning procedure described in Example 1 and this Example were as follows.

(a) The conditioning medium was a 50/50 (by volume) mixture of a proprietary ethylene glycol based antifreeze manufactured by ICI for sale to the motor industry and de-ionised water.
(b) The air oven temperature was about 1±° C.
(c) The vessel was filled to a level 50 m the upper flange of the vessel, after the test specimens were inserted.

After the conditioning time of 4 days the vessels were allowed to cool to room temperature, the bars were removed and stored in the conditioning liquid at room temperature and superficially dried just before testing.

The Charpy specimens were tested by the methods of ISO 179/2C (notched) and 179/2D (unnotched). The tensile bar specimens (ISO R527, bar type 1) were in this case subjected to a combined flexural modulus/flexural strength test, using the central portion of the bar, but in accordance with the procedure of ISO 178. Three specimens were used in each test, the mean results are given in Table VI.

TABLE VI

| Compound type: | 30% GR nylon 66, heat stabilised, natural, as described in Example 4. | | | |
|---|---|---|---|---|
| Ageing: | Medium: 50/50 water/ICI proprietary antifreeze | | | |
| | Temperature: 135° C. | | | |
| | Time: 4 days. | | | |
| | Property and Units | | | |
| Additive | Flexural Strength MPa | Flexural Strength GPa | Unnotched Charpy Impact Strength kJ/m$^2$ | Notched Charpy Impact Strength kJ/m$^2$ |
| Nil (control) | 114 | 3.1 | 49 | 19 |
| 0.5% EMA 21 | 124 | 3.3 | 55 | 21 |

I claim:

1. A vehicle radiator end tank made from a reinforced composition comprising a polyamide selected from the group consisting of nylon 66, nylon 6 and nylon 610, or copolymers thereof, from 10% to 60% by weight of reinforcing filler and from 0.1 to 10% by weight of a copolymer formed from ethylenically unsaturated monomers and having functional groups extending from the polymer chain capable of reaction with the end groups of the polyamide wherein the copolymer contains up to 50 mole % of residues obtained from ethylenically unsaturated monomers containing functional groups.

2. A vehicle radiator end tank according to claim 1 wherein the functional groups are carboxylic acid groups of carboxylic acid anhydride groups.

3. A vehicle radiator end tank according to claim 1 or claim 2 in which the copolymer contains at least 50% by weight of copolymerised units selected from alkyl acrylates or alkyl methacrylates containing from 1 to 10 carbon atoms, olefins and styrene.

4. A vehicle radiator end tank according to claim 1 or claim 2 in which the reinforcing filler is glass fibre.

5. A vehicle radiator end tank according to claim 1 or claim 2 in which the copolymer is cross-linked.

6. A radiator end tank as set forth in claim 1 wherein the amount of said copolymer formed from ethylenically unsaturated monomers is 0.25 to 5% by weight.

* * * * *